Feb. 27, 1945. P. P. GROSSO 2,370,459
IRRIGATING SPECULUM
Filed May 8, 1941 2 Sheets-Sheet 1

INVENTOR
PATRICK P. GROSSO
BY *Charles A. Morton*
ATTORNEY

Feb. 27, 1945. P. P. GROSSO 2,370,459
IRRIGATING SPECULUM
Filed May 8, 1941 2 Sheets-Sheet 2
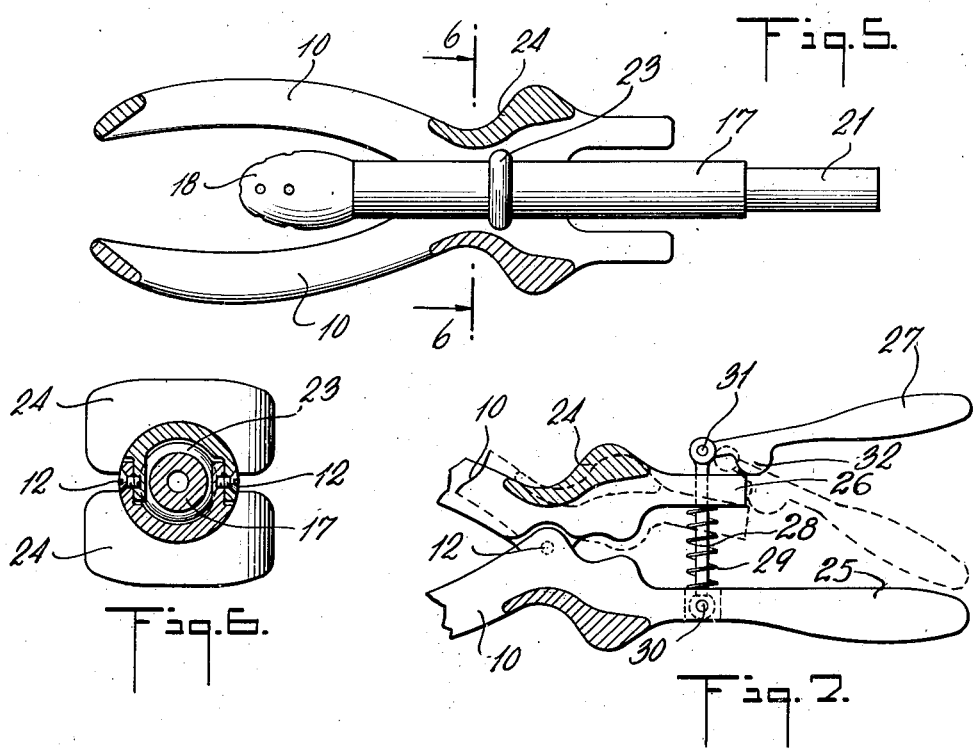
INVENTOR
PATRICK P. GROSSO
BY Charles A. Morton
ATTORNEY Patented Feb. 27, 1945

2,370,459

UNITED STATES PATENT OFFICE 2,370,459

IRRIGATING SPECULUM

Patrick P. Grosso, Brooklyn, N. Y.

Application May 8, 1941, Serial No. 392,460

2 Claims. (Cl. 128—3)

This invention relates to an irrigating speculum, either vaginal or rectal, depending upon the size.

The object of this invention is an irrigating speculum which can be used for introducing medication into body cavities, for insufflation of powders, instillation of medicated jellies and solutions, and for irrigation and cleansing douches.

Another object is an irrigating speculum so constructed that it can be easily inserted into, manipulated in, or withdrawn from, a body cavity, without the slightest trauma to the parts.

Another object is an irrigating speculum which can be rotated in a body cavity so as to permit the medication or fluid to reach all surfaces of the tissues to be treated or disinfected.

In the drawings comprising two sheets of seven figures numbered Figures 1 to 7 inclusive certain embodiments of the invention are set forth.

Fig. 5 is a longitudinal cross sectional view of a modified form;

Fig. 6 is a vertical cross section taken along the line 6—6 of Fig. 5 looking in the direction of the arrows; and Fig. 7 is a fragmentary cross sectional view showing a modified form of lever handle.

Like reference characters designate corresponding parts throughout the several figures of the drawings.

Figure 4:
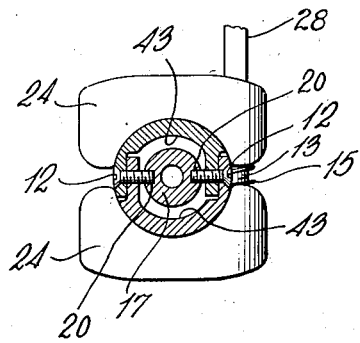
Fig. 4 is a vertical cross section taken along the line 4—4 of Fig. 2 looking in the direction of the arrows.

The bivalves or lever arms 10 are pivoted together at 12 by suitable flush headed pivot screws. The bivalves 10 are fenestrated at 11 to facilitate access to the surfaces of the tissues. The neck 43 (Fig. 4) of each bivalve is recessed to form a substantially semicircular channel, and when the bivalves are pivoted together with the screws 12—12 (Fig. 4), the semicircular channels in the necks of the bivalves 10—10 together form a throat 43 (Fig. 4) substantially circular in cross section through which a canula 17 may be removably inserted. The wall of the canula may be drilled and tapped to provide the oppositely threaded sockets 20 (Fig. 4) wherein the pivoted screws 12 may be screwed, thereby pivoting the canula 17 in the throat of the bivalve 10.

Figure 1:
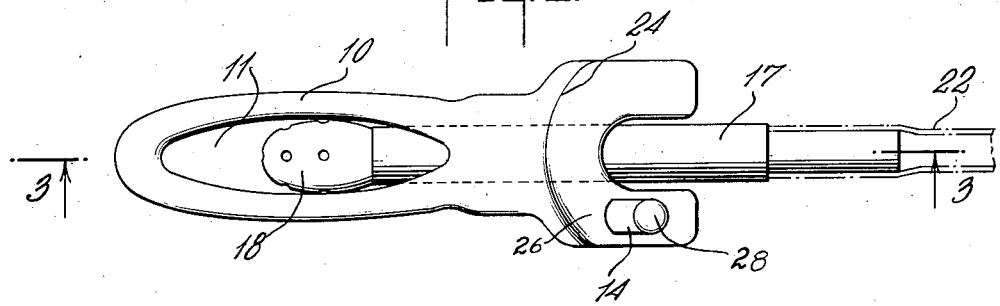
Fig. 1 is a top plan view of one form of irrigating speculum.

Canula 17 terminates at one end in a nozzle 18, and at its opposite end it terminates in a nipple 21 for receiving one end 22 of a section of flexible tubing (Fig. 1). The other end of the flexible tubing 22 may be connected to a suitable source of supply containing the irrigating or cleansing solution, or it may be connected to a suitable source of pressure such as an air pump. The nozzle 18 of canula 17 is suitably perforated and may be female threaded for attachment to a male thread stem 19 formed on the canula 17. This arrangement permits the removal of the perforated nozzle without releasing the pivot screws 12. The bivalves 10 are elongated, and are concavo-convex both longitudinally and transversely; the bivalves 10 are provided with shoulders 24—24, which are shaped so as to fit snugly against the external margins of the body orifice, thus tending to retain the speculum in proper position when in use, and to prevent the speculum from being inserted too far in the orifice.

Figure 2:
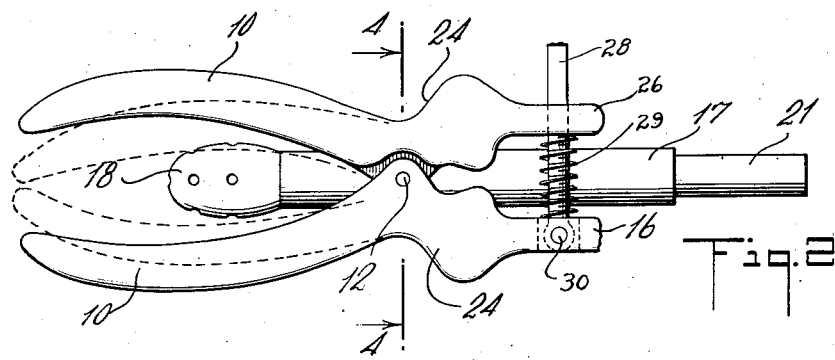
Fig. 2 is a side elevation thereof.

A pin or cross bar 28 is pivoted at 30 to the shank 16 of handle 25. Pin 28 passes through a slotted opening 14 formed in the lever arm 26. An expanded spring 29 is mounted upon the cross bar 28, said spring being positioned between the shank 16 and the lever arm 26. Spring 29 tends to force the shank 16 and the lever arm 26 apart, thereby tending to close the bivalves 10—10 to the dotted line position shown in Fig. 2.

A locking handle 27 is pivoted at 31 to cross bar 28. Handle 27 is provided with a locking catch 32 and when the handles 25 and 27 are gripped tightly, handle 27 swings on its pivot 31 towards handle 25 causing locking catch 32 to engage lever arm 26, thus forcing lever arm 26 and handle 25 towards each other thereby separating the bivalves 10—10 to enlarge the body orifice. Locking catch 32 which is an eccentric cam moves with handle 27 about the pivot 31 towards handle 25 against the increased tension of spring 29, until catch 32 engages and locks against lever arm 26 to prevent premature release of the speculum. To release the speculum handle 27 is forced away from handle 25 thereby releasing locking catch 32 from lever arm 26, thus permitting coiled spring 29 to expand and force lever arm 26 away from handle 25, thereby causing the bivalves 10—10 to come together about the pivot screws 12—12 whereupon the speculum may be withdrawn from the body orifice.

Before using, the speculum is sterilized and the tension upon the lever arm 26 is relaxed to permit the expanded spring 29 to force the handle 25 and the lever arm 26 apart, thus forcing the bivalves 10—10 into contact with each other, in order that the speculum may be easily inserted in the body orifice. The speculum is now inserted in the vaginal cavity or other body orifice until the shoulders 24—24 set snugly against the outer portion of the body, and while the speculum is retained in this position the handles 27 and 25 are gripped in the hand, and the handle 27 swings about the pivot 31 against increased tension of spring 29, thereby forcing the lever arm 26 towards the shank 16, to separate the bivalves 10—10 and expand the body orifice so as to stretch the surrounding tissues. The tissues are now medicated, irrigated, or cleansed, and while this is proceeding, the speculum may be rotated in the body cavity without trauma of the tissues. The fenestrations 11—11 facilitate ready access to the tissues, and the rotation of the speculum permits the medication or fluid to reach all surfaces of the tissues to be treated or disinfected. With the bivalves 10—10 spread apart, the canula 17 may also be moved about its pivotal mounting formed between pivot screws 12—12, thereby further facilitating application of the medication to all parts of the tissues. When the locking catch 32 is released, the coiled spring 29 forces the lever arm 26 away from the shank 16, thus bringing the bivalves 10—10 together to permit the withdrawal of the speculum from the body orifice.

The canula 17 may be mounted upon the pivot screws 12—12, so that when the speculum is in use, the canula may be moved about said pivotal mounting to facilitate the application of the medication to all parts of the tissues. Canula 17 is slidably mounted relative to the bivalves 10—10 and may be inserted in or removed from the throat of the bivalves. An annular stop 23 limits the extent of inward movement of the canula 17 relative to the bivalves 10—10. By this arrangement the speculum can be introduced into the body orifice and expanded and secured in place, before the canula 17 is inserted in position. The arrangement also permits the interchange of canula of various types without disturbing or removing the speculum. When the speculum construction is equipped with interchangeable canula, it is particularly adapted for clinical use where the need for interchangeable canula frequently arises during a treatment.

Figure 3:
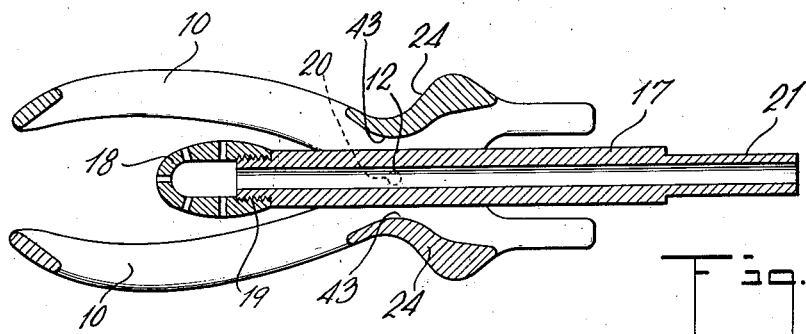
Fig. 3 is a vertical cross section taken along the line 3—3 of Fig. 1 looking in the direction of the arrows.

When interchangeable canula are employed, the perforated nozzle 18 may either be permanently attached to the canula or it may be threadably detachable as shown in Fig. 3. The position of the bivalves and shoulders is indicated in broken lines.

The spring 29 is very light and is provided with just enough tension to allow the bivalves to remain in closed position when handle 27 is in the released position while the speculum is being inserted in the body orifice. Because of its simple construction and the light tension of the spring there is no possibility of pinching the tissues or other parts of the body which are in contact with the speculum, so that the risk of trauma or other injury is eliminated. The instrument may be inserted and adjusted by the user without outside assistance, and without the user resorting to a prone position.

The speculum and the canula may be made of a plastic substance such as lucite, or the instrument may be made of metal or of any other suitable material.

What I claim is:

1. In an irrigating speculum the combination of a pair of lever arms, each of said lever arms having an elongated fenestrated blade portion, a shoulder portion, and a neck portion joining the blade to the shoulder, each of said blades being of concavo-convex formation both longitudinally and transversely, each neck portion being concavo-convex in cross section, said lever arms being pivotally mounted together at the neck with the concave sides of the blade and neck portions facing inwards, said neck portions in conjunction forming a throated passage, said lever arms being swingable about said pivots to move said shoulders toward and away from each other to open and close said blades, a pin secured to one shoulder and passing through the other, an expanded spring mounted upon said pin between the shoulders to normally separate them and maintain the blades in closed position, a handle pivoted to the pin and operable to swing about its pivot to engage the shoulder and lock said blades in separated position against the increased tension of the spring, and a canula removably slidably mounted in the throated passage for manipulation between the separated blades.

2. In an irrigating speculum the combination of a pair of lever arms, each lever arm having a fenestrated blade portion, an inwardly curving neck portion merging with the base of the blade, and a laterally projecting shoulder portion in continuation of the neck portion, the fenestrated blade portion, neck portion and shoulder portion of each lever arm being formed out of one single piece of material, each of said blades being of concavo-convex formation both longitudinally and transversely, each neck portion being concavo-convex in cross section, pivotal connections between said lever arms, said pivotal connections being mounted in the neck portions with the concave sides of the blades and neck portions facing inwards and with the shoulders projecting laterally outwards, the heads of said pivotal connections lying within the curved surfaces of the neck portions, said neck portions in conjunction forming a throated passage, said shoulders in conjunction conforming generally to the contour of the external margins of a body orifice so as to engage said external margins and limit the depth of insertion of the speculum in the orifice, said lever arms being swingable about said pivots to move said shoulders toward each other to open and away from each other to close said blades, a pin pivotally secured to one shoulder and passing through the other, an expanded spring mounted upon said pin between the shoulders to normally separate them and maintain the blades in closed position, a handle pivoted to the pin and operable to swing about its pivot against increased tension of the spring to engage the shoulder and lock the blades in separated position, a removable canula having a detachable nozzle at one end and a nipple at the other, said canula being slidably mountable nozzle end first in the throated passage for manipulation between the separated blades, and means operable to limit the forward movement of the canula.

PATRICK P. GROSSO.